(12) United States Patent
Shimizu

(10) Patent No.: US 11,840,202 B2
(45) Date of Patent: Dec. 12, 2023

(54) VEHICLE CONTROL APPARATUS

(71) Applicant: TOYOTA JIDOSHA KABUSHIKI KAISHA, Toyota (JP)

(72) Inventor: Ryusuke Shimizu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 17/509,792

(22) Filed: Oct. 25, 2021

(65) Prior Publication Data

US 2022/0153234 A1    May 19, 2022

(30) Foreign Application Priority Data

Nov. 19, 2020  (JP) ................................ 2020-192334

(51) Int. Cl.
*B60S 1/48*    (2006.01)
*B60W 30/08*   (2012.01)
*B60S 1/56*    (2006.01)

(52) U.S. Cl.
CPC ............. *B60S 1/485* (2013.01); *B60S 1/56* (2013.01); *B60W 30/08* (2013.01)

(58) Field of Classification Search
CPC ................ B60W 30/08; B60W 30/095–0956
See application file for complete search history.

(56) References Cited

U.S. PATENT DOCUMENTS

| | | | | |
|---|---|---|---|---|
| 2008/0133136 A1* | 6/2008 | Breed | ................ | G05D 1/0274 340/901 |
| 2015/0032292 A1* | 1/2015 | Stratton | ................ | B60S 1/0848 701/2 |
| 2015/0090291 A1* | 4/2015 | Na | ................ | B60S 1/52 134/6 |
| 2015/0094908 A1* | 4/2015 | Hirota | ................ | B60S 1/0818 701/36 |
| 2015/0203076 A1* | 7/2015 | Irie | ................ | G02B 27/0006 15/319 |
| 2017/0285649 A1* | 10/2017 | Debreczeni | ................ | G05D 1/0088 |
| 2018/0222473 A1* | 8/2018 | Shami | ................ | B60W 50/14 |
| 2018/0354469 A1* | 12/2018 | Krishnan | ................ | G01S 17/931 |
| 2018/0361973 A1* | 12/2018 | Harada | ................ | B60R 21/0134 |
| 2019/0009752 A1* | 1/2019 | Rice | ................ | B60S 1/56 |
| 2019/0143936 A1* | 5/2019 | Abel Rayan | ................ | B60R 25/10 701/2 |
| 2019/0202407 A1* | 7/2019 | Jia | ................ | B60S 1/0848 |

(Continued)

FOREIGN PATENT DOCUMENTS

| | | |
|---|---|---|
| JP | 2018-154285 A | 10/2018 |
| JP | 2019-003459 A | 1/2019 |
| JP | 2019-104365 A | 6/2019 |

*Primary Examiner* — Spencer E. Bell
*Assistant Examiner* — Omair Chaudhri
(74) *Attorney, Agent, or Firm* — Sughrue Mion, PLLC

(57) ABSTRACT

The vehicle control apparatus is mounted on a vehicle. The vehicle control apparatus includes a cleaning unit capable of performing a first cleaning operation to clean a detecting surface part of a LiDAR using cleaning fluid, and a cleaning control ECU configured to execute a first light-degree cleaning process to let the first cleaning unit perform a first cleaning operation for a first light-degree cleaning time. The cleaning control ECU executes the first light-degree cleaning process when a first light-degree cleaning condition becomes satisfied within a first allowable period.

7 Claims, 8 Drawing Sheets

(56) References Cited

U.S. PATENT DOCUMENTS

| | | | |
|---|---|---|---|
| 2019/0202411 A1* | 7/2019 | Zhao | B60S 1/52 |
| 2020/0110407 A1* | 4/2020 | Miura | B60W 50/14 |
| 2020/0216062 A1* | 7/2020 | Hakki | B64C 39/00 |
| 2020/0231065 A1* | 7/2020 | Uchimura | G08G 1/166 |
| 2020/0290606 A1* | 9/2020 | Watanabe | B60W 50/14 |
| 2020/0331435 A1* | 10/2020 | Dingli | B60R 11/04 |
| 2020/0369264 A1* | 11/2020 | Cheon | B60W 30/09 |
| 2021/0080967 A1* | 3/2021 | Pettinger | B60W 50/14 |
| 2021/0107040 A1* | 4/2021 | Violetta | B08B 3/041 |
| 2021/0188259 A1* | 6/2021 | Kim | B60W 10/20 |
| 2021/0188261 A1* | 6/2021 | Song | B60W 50/14 |
| 2021/0197769 A1* | 7/2021 | Shirakura | B60S 1/486 |
| 2021/0197807 A1* | 7/2021 | Park | B60W 30/09 |
| 2021/0201054 A1* | 7/2021 | Toth | H04N 23/80 |
| 2021/0380102 A1* | 12/2021 | Kim | B60W 30/19 |

\* cited by examiner

VEHICLE CONTROL APPARATUS

TECHNICAL FIELD

The present disclosure relates to a vehicle control apparatus configured to control a cleaning unit for cleaning a detecting surface part of an on-board sensor, and to let/make a driving assist device perform a driving assist operation to avoid a collision between a vehicle and an obstacle detected by the on-board sensor.

BACKGROUND

Conventionally, a vehicle (host/own vehicle) equipped with a vehicle control apparatus has been known. The vehicle control apparatus is configured to control a cleaning unit for cleaning a detecting surface part of an on-board sensor, and to control the vehicle so as to avoid a collision between the vehicle and an obstacle which is a 3-dimensional object detected by the on-board sensor. The on-board sensor is configured to obtain object information that is information on a 3-dimensional object, using electromagnetic wave that is radiated through the detecting surface part of the on-board sensor.

The vehicle control apparatus is configured to let/make a driving assist device perform a driving assist operation (e.g., collision avoidance operation) to avoid a collision between the vehicle and an obstacle that is a 3-dimensional object that may obstruct the vehicle from running, using the object information.

When the detecting surface part of the on-board sensor becomes dirty, the vehicle control apparatus controls the cleaning unit in such a manner that the cleaning unit automatically cleans/washes the detecting surface part of the on-board sensor with cleaning fluid. Therefore, the vehicle control apparatus can prevent the object information from becoming inaccurate due to the dirtiness of the detecting surface part of the on-board sensor.

Japanese Patent Application Laid-Open No. 2019-104365 discloses an on-board sensor cleaning apparatus (hereinafter, referred to as a "conventional apparatus"). The conventional apparatus determines a priority order of cleaning for different types of on-board sensors based on a traveling state of the vehicle and/or a surrounding state of the vehicle. The conventional apparatus starts cleaning according to the priority order.

SUMMARY

While the driving assist operation is being executed based on the object information acquired by the on-board sensor, it is preferable that the on-board sensor be maintained in a state where detection accuracy of the on-board sensor is high.

Whereas, the conventional apparatus performs a cleaning operation to clean the detecting surface part of the on-board sensor with cleaning fluid, when the dirtiness of the detecting surface part of the on-board sensor reaches a certain level, regardless of whether or not the driving assist operation is being executed. Accordingly, if the dirtiness of the detecting surface part of the on-board sensor reaches the certain level immediately before the driving assist operation is started or during the driving assist operation is being executed, the conventional apparatus performs the cleaning operation while the driving assist operation is being executed. When this happens, the detection accuracy of the on-board sensor may be degraded due to the cleaning operation (i.e., the cleaning fluid) while the driving assist operation is being executed.

The present disclosure is made to cope with the problem described above. One of objectives of the present disclosure is to provide a vehicle control apparatus capable of decreasing a possibility that the detection accuracy of the on-board sensor is degraded due to the dirtiness of the detecting surface part of the on-board sensor or the cleaning operation, while the driving assist operation is being executed. Hereinafter, the vehicle control apparatus according to the present disclosure may sometimes be referred to as a "present disclosure vehicle control apparatus".

The present disclosure vehicle control apparatus comprises:
- a first on-board sensor (11) configured to obtain object information on object that is present around (in the vicinity of, or surroundings of) a vehicle (SV), using electromagnetic wave which passes through a first detecting surface part exposed to outside of the vehicle (SV);
- a first cleaning unit (U1) configured to be capable of performing a first cleaning operation to clean (or wash) the first detecting surface part using cleaning fluid;
- a driving assist device including at least one of a control actuator (21, 31, 42) configured to change a state (running state) of the vehicle and a warning device configured to generate a warning (or an alert/alarm) to an occupant of the vehicle; and
- a control unit (10, 60) configured to:
- control the first cleaning unit;
- obtain (or calculate), based on the object information, a collision probability indicating value correlated with a probability that the vehicle collides with the object; and
- let the driving assist device perform a driving assist operation to avoid a collision between the vehicle and an obstacle (OV1) that is the object whose collision probability indicating value satisfies a predetermined driving assist condition, from an assist start time point (t3) at which the collision probability indicating value satisfies the driving assist condition.

The control unit is configured to:
- obtain a first dirty degree indicating value representing a degree of dirtiness of the first detecting surface part;
- start a first normal cleaning process (step 620) to let the first cleaning unit perform the first cleaning operation for a first normal time, when a first normal cleaning condition becomes satisfied ("No" at step 615), the first normal cleaning condition being a condition to be satisfied when the first dirty degree indicating value is equal to or greater than a first threshold (Dth1), and
- start a first light-degree cleaning process (step 620) to let the first cleaning unit perform the first cleaning operation for a first light-degree cleaning time, when a first light-degree cleaning condition becomes satisfied within a first allowable period (P1) ("Yes" at step 615, "Yes" at step 635, "Yes" at step 640), the first light-degree cleaning condition being a condition to be satisfied when the first dirty degree indicating value is smaller than the first threshold and is equal to or greater than a second threshold (Dth2) that is smaller than the first threshold, wherein,
a start time point of the first allowable period is set at a time point (t1 shown in FIG. 3) a first start time longer than the first light-degree cleaning time before the assist start time point; and an end time point of the first allowable period is set at a time point (t2 shown in FIG. 3) a first necessary time (T1) based on the first light-degree cleaning time before the assist start time point, the first necessary time being longer than the first light-degree cleaning time and shorter than the first start time.

According to the present disclosure vehicle control apparatus, when the first dirty degree indicating value is equal to or greater than the second threshold and is smaller than the first threshold within the first allowable period, the first light-degree cleaning process is performed. Accordingly, the present disclosure vehicle control apparatus can reduce the possibility that the detection accuracy of the first on-board sensor is degraded due to the dirtiness of the detecting surface part of the first on-board sensor or due to the first cleaning operation, while the driving assist operation is being executed.

In one of the embodiments of the present disclosure vehicle control apparatus includes:
  a second on-board sensor (12) configured to repeatedly obtain image data of the object that is present around (in the vicinity of, or surroundings of) the vehicle, using light, as electromagnetic wave, which passes through a second detecting surface part exposed to outside of the vehicle;
  a storing device configured to store information including the image data; and
  a second cleaning unit (U1) configured to be capable of performing a second cleaning operation to clean the second detecting surface part using cleaning fluid.

In the above embodiment, the control unit is configured to:
  obtain a second dirty degree indicating value representing a degree of dirtiness of the second detecting surface part;
  start a second normal cleaning process (step 720) to let the second cleaning unit perform the second cleaning operation for a second normal time, when a second normal cleaning condition becomes satisfied ("No" at step 715), the second normal cleaning condition being a condition to be satisfied when the second dirty degree indicating value is equal to or greater than a third threshold (Dth3); and
  start a second light-degree cleaning process (step 720) to let the second cleaning unit perform the second cleaning operation for a second light-degree cleaning time, when a second light-degree cleaning condition becomes satisfied within a second allowable period (P2) ("Yes" at step 715, "Yes" at step 735, "Yes" at step 740), the second light-degree cleaning condition being a condition to be satisfied when the second dirty degree indicating value is smaller than the third threshold and is equal to or greater than a fourth threshold (Dth4) that is smaller than the third threshold,
wherein,
an end time point of the second allowable period is set at a time point (t3 shown in FIG. 4) a predetermined time longer than a second necessary time based on the second light-degree cleaning time before a predicted collision occurrence time point (t4) at which the collision probability indicating value reaches a value obtained when the vehicle and the obstacle are presumed to collide with each other; and
a start time point of the second allowable period is set at a time point (t1 shown in FIG. 4) before the end time point of the second allowable period.

According to the present disclosure vehicle control apparatus, when the second dirty degree indicating value is equal to or greater than the fourth threshold and is smaller than the third threshold within the second allowable period, the second light-degree cleaning process is performed. Accordingly, the above-described embodiment can reduce a possibility that the image of the obstacle taken by the second on-board sensor becomes blurry due to the dirtiness of the detecting surface part of the second on-board sensor or the second cleaning operation when the vehicle reaches the obstacle.

In one of the embodiments of the present disclosure vehicle control apparatus, the end time point of the second allowable period is set at the assist start time point.

According to the above-described embodiment, since the end time point of the second allowable period is set at the assist start time point, the possibility that the image of the obstacle taken by the second on-board sensor becomes blurry due to the dirtiness of the detecting surface part of the second on-board sensor or the second cleaning operation when the vehicle reaches the obstacle can be reduced.

In one of the embodiments of the present disclosure vehicle control apparatus, the control unit is configured to:
  calculate, as the collision probability indicating value, a collision prediction time (TTC) which is a predicted time between a present time point and a time point at which the vehicle collides with the object (step 530);
  determine that the driving assist condition becomes satisfied when the collision prediction time becomes shorter than a predetermined collision determination threshold time (TTCth) ("Yes" at step 535);
  set the start time point of the first allowable period to a time point (t1 shown in FIG. 3) at which the collision prediction time becomes equal to a second threshold time (Tth2) that is equal to a sum of the collision determination threshold time and the first start time; and
  set the end time point of the first allowable period to a time point (t2 shown in FIG. 3) at which the collision prediction time becomes equal to a first threshold time (Tth1) that is equal to a sum of the collision determination threshold time and the first necessary time.

According to the above-described embodiment, the start and end time points of the first allowable period have been set as described above. Therefore, the above-described embodiment can reduce the possibility that the detection accuracy of the first on-board sensor is degraded due to the dirtiness of the detecting surface part of the first on-board sensor or due to the first cleaning operation, while the driving assist operation is being executed.

In one of the embodiments of the present disclosure vehicle control apparatus, the control unit is configured to:
  calculate, as the collision probability indicating value, a collision prediction time which is a predicted time between a present time point and a time point at which the vehicle collides with the object;
  determine that the driving assist condition becomes satisfied when the collision prediction time becomes shorter than a predetermined collision determination threshold time;
  set the start time point of the second allowable period to a time point (t1 shown in FIG. 4) at which the collision prediction time becomes equal to a fourth threshold time (Th4) that is longer than a third threshold time (Tth3); and set the end time point of the second allowable period to a time point (t3 shown in FIG. 4) at which the collision prediction time becomes equal to the third threshold time.

According to the above-described embodiment, the time point at which the collision prediction time becomes equal to the fourth threshold time is set as the start time point of the second allowable period, and the time point at which the collision prediction time becomes equal to the third threshold time is set as the end time point of the second allowable period. Therefore, the possibility that the image of the obstacle taken by the second on-board sensor becomes blurry due to the dirtiness of the detecting surface part of the second on-board sensor or the second cleaning operation when the vehicle reaches the obstacle can be reduced.

In one of the embodiments of the present disclosure vehicle control apparatus, the third threshold time is equal to the collision determination threshold time.

Accordingly, the above-described embodiment can reduce the possibility that the image of the obstacle taken by the second on-board sensor becomes blurry due to the dirtiness of the detecting surface part of the second on-board sensor or the second cleaning operation when the vehicle reaches the obstacle.

In one of the embodiments of the present disclosure vehicle control apparatus, the first necessary time is equal to a sum of a first light-degree cleaning process time (TW1) based on the first light-degree cleaning time and a first recognition restoring time (TR1) based on a time necessary for the first on-board sensor to restore its detecting accuracy of the first on-board sensor after the first cleaning process; and the first start time is a sum of the first necessary time and a predetermined first cleaning allowable adjustment time (Δt1).

According to the above-described embodiment, the first necessary time is equal to the sum of the first light-degree cleaning process time and the first recognition restoring time, and the first start time is the sum of the first necessary time and the first cleaning allowable adjustment time. Therefore, the above-described embodiment can reduce the possibility that the detection accuracy of the first on-board sensor is degraded due to the dirtiness of the detecting surface part of the first on-board sensor or due to the first cleaning operation, while the driving assist operation is being executed.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols.

DETAILED DESCRIPTION

<Configuration>

Figure 1:
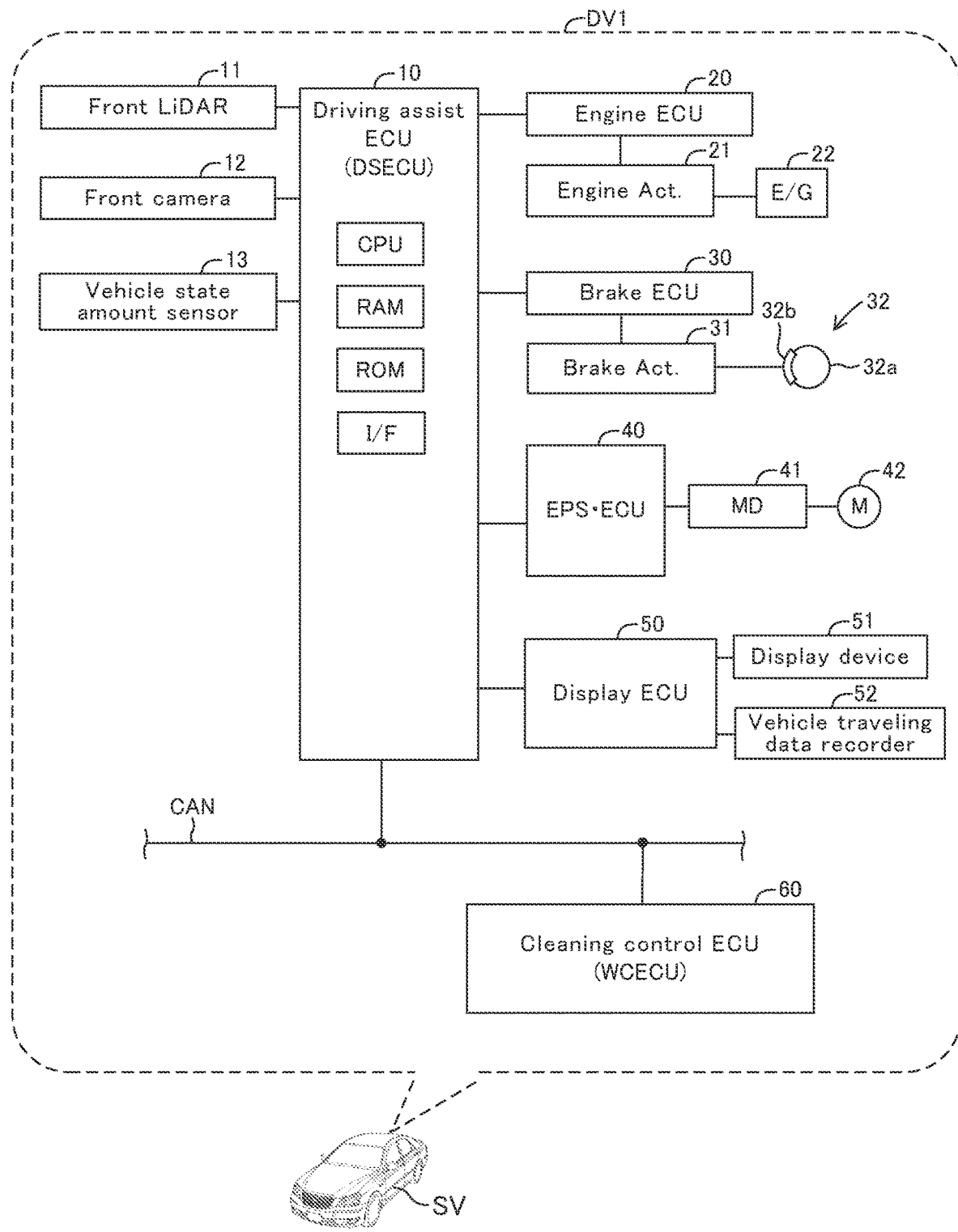
FIG. 1 is a schematic diagram of a part of a vehicle control apparatus according to an embodiment of the present disclosure.

As shown in FIG. 1, a vehicle control apparatus (hereinafter, sometimes referred to as a "present vehicle control apparatus") DV1 according to an embodiment of the present disclosure is applied to a vehicle SV.

The vehicle control apparatus DV1 comprises a driving assist/support ECU 10, an engine ECU 20, a brake ECU 30, an electric power steering ECU 40, a display ECU 50, and a cleaning (or washing) control ECU 60. The driving assist ECU 10 is referred to as a "DSECU". The electric power steering ECU is referred to as an "EPS·ECU 40". The cleaning control ECU 60 is referred to as a "WCECU". A set of the DSECU and the WCECU may be referred to as a "control device/unit", for convenience sake.

Each of these ECUs is an electronic control unit that includes a microcomputer as a main component, and is sometimes referred to as a controller. The microcomputer includes a CPU, a ROM, a RAM, and an interface (I/F). These ECUs are connected with to one another through a CAN (controller area network) such that the ECUs can send and receive pieces of information to and from one another. The CPU realizes various functions by executing instructions (programs, routines) stored in the ROM. Some or all of the ECUs may be integrated into a single ECU.

The vehicle control apparatus DV1 further comprises a front LiDAR 11, a front camera 12, and a vehicle state amount sensor 13. They are connected to the DSECU. The front LiDAR 11 may be referred to as a "first on-board sensor". The front camera 12 may be referred to as a "second on-board sensor".

The front LiDAR 11 is disposed at a lower section of an unillustrated front grille of the vehicle SV and in the vicinity of a center in a vehicle width direction of the front grille. The front LiDAR 11 is one of on-board sensors, and has a detecting surface part (detecting surface section) that is exposed to the outside of the vehicle SV. The front LiDAR 11 radiates laser that is a kind of electromagnetic wave to a detection area ahead of (in front of) the vehicle through the detecting surface part. A 3-dimensional object present in the detection area reflects the laser radiated from the front LiDAR 11. The front LiDAR 11 receives the reflected laser by the 3-dimensional object so as to obtain information on the 3-dimensional object. It should be noted that information on the 3-dimensional object is referred to as "object information". The object information obtained by the front LiDAR 11 includes a longitudinal distance Dfx between the vehicle SV and the 3-dimensional object in a front-rear direction of the vehicle SV, a relative speed Vfx of the 3-dimensional object with respect to the vehicle SV, and a relative position (or a direction) of the 3-dimensional object with respect to the vehicle SV. The front LiDAR 11 transmits the obtained object information to the DSECU.

The front camera 12 is disposed at an upper section of the unillustrated front grille of the vehicle SV and in the vicinity of the center in the vehicle width direction of the front grille. The front camera 12 is one of the on-board sensors, and has a detecting surface part (detecting surface section) that is exposed to the outside of the vehicle SV. The front camera 12 includes an unillustrated light receiving element. Light (visible light, in the present example) from an area in front of the vehicle SV corresponding to a shooting range of the front camera 12 is led to the light receiving element through the detecting surface part of the front camera 12. The front camera 12 obtains image information (front image information) representing the area (scene) in front of the vehicle SV using the light receiving element. The front camera 12 obtains the front image information (front image data) and transmits the obtained front image information to the DSECU, every time a predetermined time elapses.

The vehicle state amount sensor 13 includes various sensors, each detecting a moving state of the vehicle SV. The vehicle state amount sensor 13 includes:
- a steering angle sensor for detecting a steering angle θ of the vehicle SV;
- a vehicle speed sensor for detecting a running/traveling speed (i.e., vehicle speed) Vs of the vehicle SV; and
- a yaw rate sensor for detecting a yaw rate of the vehicle SV.

The engine ECU 20 is connected to an engine actuator 21. The engine actuator 21 includes a throttle valve actuator for changing an opening degree of the throttle valve. The engine ECU 20 is configured to drive the throttle valve actuator 21 so as to vary a torque generated by an engine (internal combustion engine) 22. The torque generated by the engine 22 is transmitted to drive wheels through an unillustrated transmission.

Therefore, the engine ECU 20 can control a driving force of the vehicle SV by controlling the engine actuator 21 so as to vary an acceleration state (front-rear direction acceleration) of the vehicle SV. It should be noted that the engine ECU 20 can control the driving force of the vehicle SV by controlling at least one of "the engine and a motor" that serve as a vehicle driving source, when the vehicle SV is a hybrid electric vehicle. The engine ECU 20 can control the driving force of the vehicle SV by controlling a motor that serves as a vehicle driving source, when the vehicle SV is a battery electric vehicle.

The brake ECU 30 is connected to a brake actuator 31. The brake actuator 31 is disposed in a hydraulic circuit between a master cylinder and frictional brake mechanisms 32. The master cylinder pressures a working fluid using a force on a brake pedal. Each of a front-left wheel, a front-right wheel, a rear-left wheel, and a rear-right wheel is equipped with each of the frictional brake mechanisms 32. Each of the frictional brake mechanisms 32 includes a brake disc 32a fixed to one of the wheels, and a brake caliper 32b fixed to a vehicle body.

The brake actuator 31 adjusts a hydraulic pressure of the working fluid to be supplied to a wheel cylinder integrated into the brake caliper 32b in accordance with an instruction from the brake ECU 30 to actuate the wheel cylinder. This causes the wheel cylinder to press a brake pad against brake discs 32a, to thereby generate frictional braking force. Thus, the brake ECU 30 can control a braking force of the vehicle SV by controlling the brake actuator 31, so as to vary the acceleration state (negative front-rear direction acceleration that is deceleration) of the vehicle SV.

The EPS·ECU 40 is a control unit of a well-known electric power steering system. The EPS·ECU 40 is connected to a motor driver 41. The motor driver 41 is connected to a steering motor 42. The steering motor 42 is incorporated into an "unillustrated steering mechanism including a steering wheel, a steering shaft, and a gear mechanism for steering". The steering motor 42 is an electric motor to generate a steering torque using electric power supplied from the motor driver 41 to thereby be able to change a steering angle θ of the vehicle SV (also referred to as a "turning angle" of steered wheels).

When the EPS·ECU 40 receives a steering instruction from the DSECU, the EPS·ECU 40 drives the steering motor 42 using the motor driver 41, based on a target steering torque specified by the steering instruction, in such a manner that an actual steering torque coincides with the target steering torque. The thus generated steering torque is different from a steering assist torque for assisting an operation to the steering wheel by the driver, but is a torque based on the steering instruction transmitted from the DSECU. Therefore, the DSECU can automatically change the turning angle of the steered wheels of the vehicle SV through the EPS·ECU 40.

The display ECU 50 is connected to a display device 51 and a vehicle traveling data recorder 52. The display ECU 50 obtains the front image information from the front camera 12 through the DSECU every time a predetermined time elapses, and produces an image (referred to as a "front image") representing a scene ahead of (in front of) the vehicle SV using the obtained front image information.

The display device 51 is a touch panel screen that can display an image. The display device 51 may be the other type of display such as a display installed in an electronic inner mirror, and a head up display. The display ECU 50 displays the produced front image on the display device 51 in accordance with an instruction from the DSECU.

The vehicle traveling data recorder 52 is an image storage device capable of storing the front image. The display ECU 50 transmits the produced front image to the vehicle traveling data recorder 52. The vehicle traveling data recorder 52 includes a storing device that stores the transmitted front image. The vehicle traveling data recorder 52 has a function to display the stored front image on the display device 51 by transmitting the stored front image to the display device 51.

<Outline of Collision Avoidance Control>

The DSECU performs an obstacle response control as a driving assist operation to control the vehicle SV in such a manner the vehicle SV performs an operation to respond to the obstacle, when DSECU recognizes the obstacle that is a 3-dimensional object that is preset in the vicinity of (or around) the vehicle SV and may obstruct the travel of the vehicle SV. In the present example, the obstacle response control is a well-known collision avoidance control performed to avoid a collision between the vehicle SV and the obstacle (or avoid a collision with the obstacle) (for example, referred to Japanese Patent Application Laid-Open No. 2018-154285, and Japanese Patent Application Laid-Open No. 2019-003459).

More specifically, the DSECU performs the collision avoidance control when the DSECU determines that the 3-dimensional object is the obstacle and has a high possibility/probability of colliding (or is likely to collide) with the vehicle SV.

The DSECU determines whether or not the 3-dimensional object is the obstacle, as follows.

The DSECU calculates a predicted travel trajectory (path) of the vehicle SV, based on "the steering angle θ, the yaw rate Yr, and the vehicle speed Vs" of the vehicle SV.

The DSECU obtains the object information (i.e., the longitudinal distance Dfx and the relative speed Vfx) of the 3-dimensional object present ahead of the vehicle SV, from the front LiDAR 11. The DSECU determines, based on the object information of the 3-dimensional object present ahead of the vehicle SV, whether the 3-dimensional object is a moving object or a stationary object. When it is determined that the 3-dimensional object is a moving object, the DSECU calculates a predicted moving trajectory (path) of the 3-dimensional object, based on the object information on the 3-dimensional object. The DSECU obtains the predicted moving trajectory of the 3-dimensional object, based on a plurality of detected positions of the 3-dimensional object that have been obtained every elapse of a predetermined time and a present/current position of the 3-dimensional object.

The DSECU determines whether or not the vehicle SV will collide with the 3-dimensional object under a condition that the 3-dimensional object maintains a current moving condition/state (a stop state if the 3-dimensional object is the stationary object) and the vehicle SV maintains a current traveling condition/state, based on the predicted travel trajectory of the vehicle SV and the predicted moving trajectory of the 3-dimensional object. The DSECU determines that the 3-dimensional object is the obstacle when the DSECU determines that the vehicle SV will collide with the 3-dimensional object.

The DSECU obtains a collision prediction time TTC based on the object information of the obstacle. The collision prediction time TTC is a predicted time length between a present time point and a time point at which the vehicle SV collides with the obstacle. More specifically, the collision prediction time TTC is obtained by dividing the longitudinal distance Dfx of the obstacle by the relative speed Vfx of that obstacle to obtain an interim value, and by inverting the sign of the interim value (i.e., TTC=−Dfx/Vfx). It should be noted that the collision prediction time TTC is a parameter correlated with (or indicative of) a possibility/probability of collision between the vehicle SV and the obstacle (3-dimensional object), and is sometimes referred to as a "collision probability indicating value."

When the collision prediction time TTC is shorter than a collision determining time TTCth (i.e., when the collision prediction time TTC is positive and the absolute value of the collision prediction time TTC is smaller than the collision determining time TTCth), the DSECU determines that there is a high probability (or is highly likely) that the vehicle SV collides with the obstacle. It should be noted that the collision determining time TTCth is sometimes referred to as a "collision determination threshold time", for convenience sake.

When the DSECU determines that there is a high probability that the vehicle SV collides with the obstacle, the DSECU performs the well-known collision avoidance control (i.e., at least one of an automatic brake control and an automatic steering avoidance control), based on the object information The DSECU performs the automatic brake control to brake the vehicle SV so as to avoid the collision between the vehicle SV and the obstacle by sending an instruction to the brake ECU 30.

The DSECU performs the automatic steering avoidance control to steer the vehicle SV so as to avoid the collision between the vehicle SV and the obstacle by sending an instruction to the EPS·ECU 40.

<Cleaning Unit>

Figure 2:
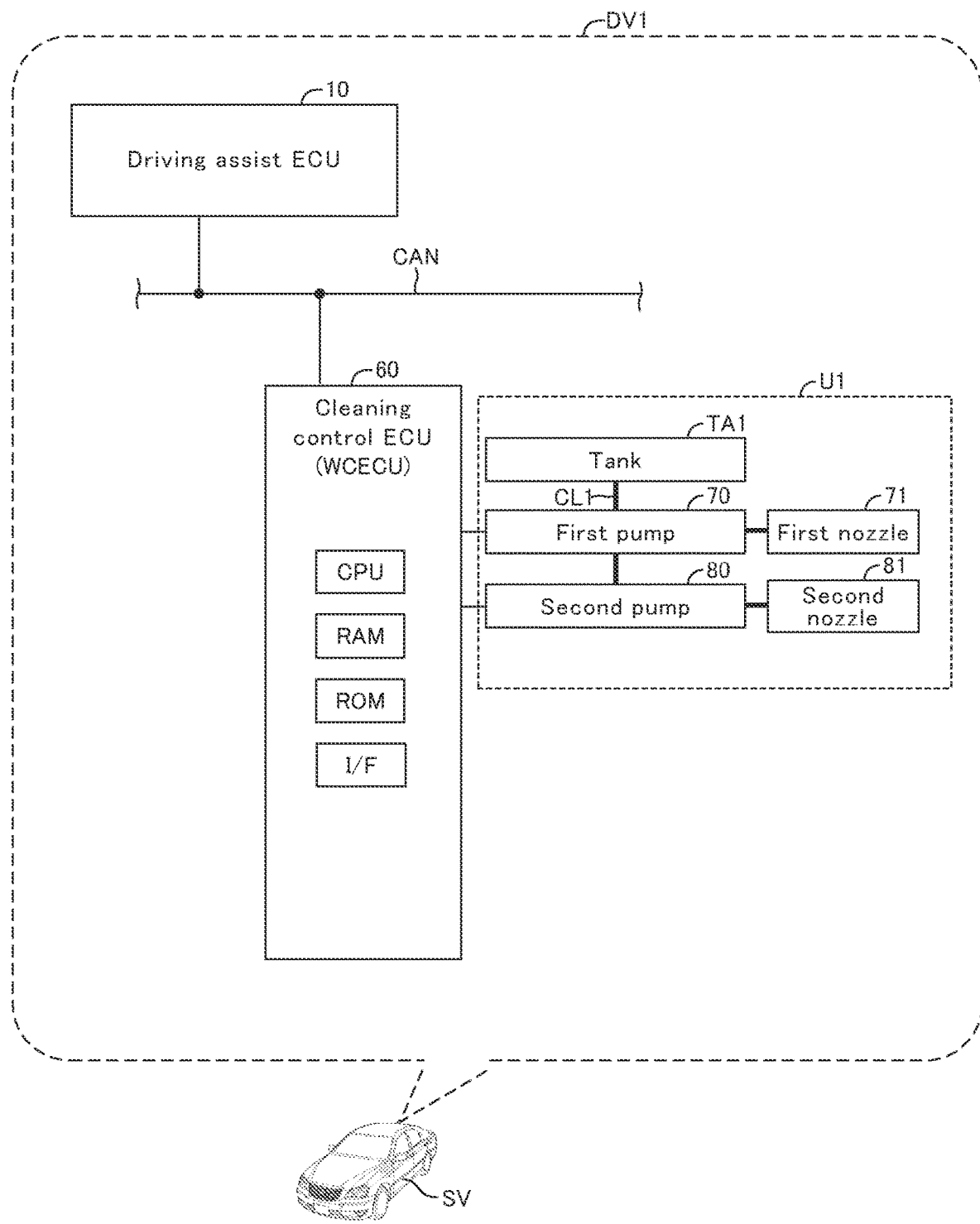
FIG. 2 is a schematic diagram of another part of the vehicle control apparatus according to the embodiment of the present disclosure.

As shown in FIG. 2, the vehicle control apparatus DV1 includes the cleaning control (washing control) ECU 60, and a cleaning unit (washing unit) U1. Hereinafter, the cleaning control ECU 60 is sometimes referred to as a "WCECU". The cleaning unit U1 includes, a first pump 70, a first nozzle 71, a second pump 80, a second nozzle 81, and a tank TA1.

The first pump 70 is communicated with the tank TA1 via a fluid pipe CL1. The first pump 70 is communicated with the first nozzle 71 via the fluid pipe CL1. The first nozzle 71 is disposed at a position from which the first nozzle 71 can inject cleaning fluid toward the detecting surface part of the front LiDAR 11. The tank TA1 is a reservoir storing the cleaning fluid.

A driving state of the first pump 70 is controlled by the WCECU. When the first pump 70 is driven by the WCECU, the first pump 70 sucks in the cleaning fluid through the fluid pipe CL1 from the tank TA1, and supplies the cleaning fluid to the first nozzle 71 through the fluid pipe CL1. The first nozzle 71 injects the cleaning fluid supplied from the tank TA1 to/toward the detecting surface part of the front LiDAR 11. Namely, the WCECU can perform a first cleaning operation to clean/wash the detecting surface part of the front LiDAR 11 by driving the first pump 70.

The second pump 80 is communicated with the tank TA1 via the fluid pipe CL1. The second pump 80 is communicated with the second nozzle 81 via the fluid pipe CL1. The second nozzle 81 is disposed at a position from which the second nozzle 81 can inject the cleaning fluid toward the detecting surface part (i.e., a lens section) of the front camera 12.

A driving state of the second pump 80 is controlled by the WCECU. When the second pump 80 is driven by the WCECU, the second pump 80 sucks in the cleaning fluid through the fluid pipe CL1 from the tank TA1, and supplies the cleaning fluid to the second nozzle 81 through the fluid pipe CL1. The second nozzle 81 injects the cleaning fluid supplied from the tank TA1 to/toward the detecting surface part of the front camera 12. Namely, the WCECU can perform a second cleaning operation to clean/wash the detecting surface part of the front camera 12 by driving the second pump 80.

<Outline of Operation>

The vehicle control apparatus DV1 cleans the detecting surface part of the front LiDAR 11 when the detecting surface part of the front LiDAR 11 becomes very dirty (or when a degree of the dirtiness of the detecting surface part of the front LiDAR 11 is great/high).

More specifically, the vehicle control apparatus DV1 obtains/detects a first dirty degree indicating value indicating the degree of dirtiness of the detecting surface part of the front LiDAR 11. The front LiDAR 11 includes a dirtiness detecting section configured to detect an amount of light (light quantity) of a laser light reflected at the detecting surface part of the front LiDAR 11 when a laser light is radiated from a light source of the front LiDAR 11. The vehicle control apparatus DV1 obtains/detects the first dirty degree indicating value, based on the detected amount of light of the laser light reflected at the detecting surface part. The first dirty degree indicating value becomes greater, as the amount of light of the laser light reflected at the detecting surface part becomes greater. It should be noted that a dirtiness detecting camera may be provided to take a picture of the detecting surface part of the front LiDAR 11, and the first dirty degree indicating value may be obtained based on the picture taken by the dirtiness detecting camera.

When the first dirty degree indicating value is equal to or greater than a first threshold Dth1, the vehicle control apparatus DV1 drives the first pump 70 to inject the cleaning fluid from the first nozzle 71 for a predetermined first cleaning time. Namely, the vehicle control apparatus DV1 perform the first cleaning operation for/over the first cleaning time to execute a first cleaning process. It should be noted that the thus executed first cleaning process may be referred to as a "first normal cleaning process", and the first cleaning time for this first cleaning process may be referred to as a "first normal time".

In addition, the vehicle control apparatus DV1 executes the first cleaning operation for the first cleaning time to perform the cleaning process only under a specific circumstance, even when the detecting surface part of the front LiDAR 11 is a little dirty, as described below.

Figure 3:
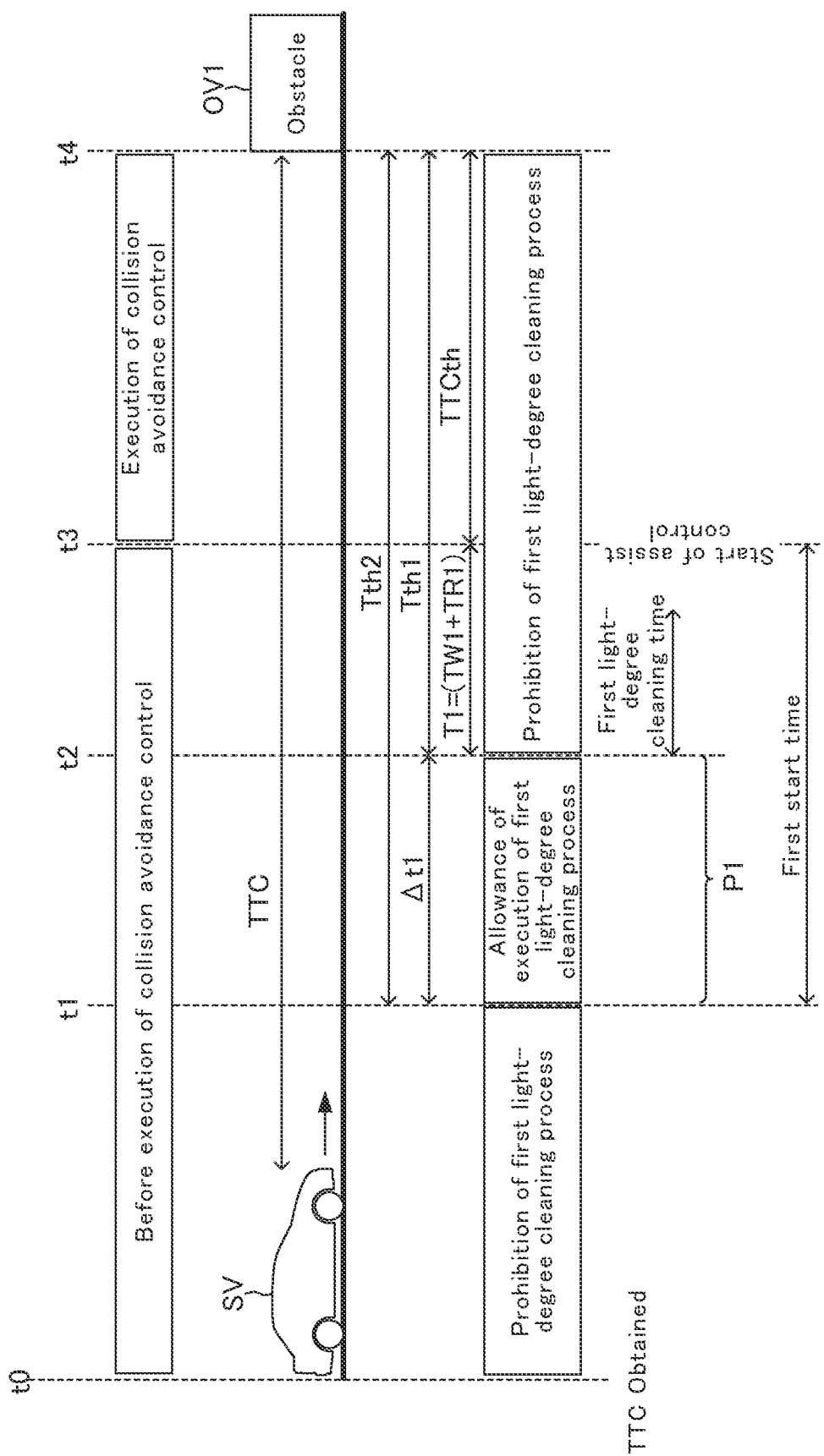
FIG. 3 is a figure for describing an outline of operations of the vehicle control apparatus.

For example, as shown in FIG. 3, it is assumed that the collision prediction time TTC for the obstacle OV1 that is present ahead of the vehicle SV continues to be updated by the DSECU after a time t0, and the collision avoidance control is started to avoid the collision between the vehicle SV and the obstacle OV1 at a time t3. The time t3 is a time point at which an execution condition of a collision avoidance control (i.e., driving assist condition) becomes satisfied so that the collision avoidance control (driving assist operation) starts to be executed, and thus, is sometimes referred to as a "assist start time point".

Under the above circumstance, accuracy of the object information on the obstacle OV1 may be degraded when the detecting surface part of the front LiDAR 11 is dirty, even if the detecting surface part of the front LiDAR 11 is a little dirty. Therefore, it is preferable that, when the detecting surface part of the front LiDAR 11 is a little dirty, the first cleaning process be executed before the collision avoidance control starts to be executed based on the object information on the obstacle OV1.

Whereas, the detecting accuracy of the front LiDAR 11 may be degraded due to the injected cleaning fluid, while the first cleaning process is being executed and in a period between a time point at which the first cleaning process ends and a time point at which the detecting accuracy of the front LiDAR 11 becomes restored.

In view of the above, the vehicle control apparatus DV1 cleans the detecting surface part of the front LiDAR 11 even when the detecting surface part of the front LiDAR 11 is a little dirty, while the collision prediction time TTC of the obstacle OV1 continues being obtained by the DSECU obtains.

More specifically, the vehicle control apparatus DV1 executes the first cleaning operation for the first cleaning time when the first dirty degree indicating value is equal to or greater than a second threshold Dth2 smaller than the first threshold Dth1, even if the first dirty degree indicating value is smaller than the first threshold Dth1. It should be noted that the thus executed first cleaning process may be referred to as a "first light-degree cleaning process", and the first cleaning time for this first cleaning process may be referred to as a "first light-degree cleaning time".

The vehicle control apparatus DV1 allows the first light-degree cleaning process to be executed (started) only when the collision prediction time TTC is equal to or longer than a first threshold time Tth1 and equal to or shorter than a second threshold time Tth2. Thus, the vehicle control apparatus DV1 allows the first light-degree cleaning process to be executed (started) only in a first light-degree cleaning process allowable period P1 that is a period between the time t1 and the time t2. It should be noted that the first light-degree cleaning process allowable period P1 may be referred to as a "first allowable period P1." A start time point of the first allowable period P1 is set at a time point a predetermined first start time longer than the first light-degree cleaning time before the assist start time point. An end point of the first allowable period P1 is set at a time point a first necessary time T1 before the assist start time point. The first necessary time T1 is longer than the first light-degree cleaning time and is shorter than the first start time, and has been determined based on the first light-degree cleaning time.

The first threshold time Tth1 is equal to a sum of the collision determining time TTCth and a first light-degree cleaning process time TW1 and a first recognition restoring time TR1 (Tth1=TTCth+TW1+TR1). The second threshold time Tth2 is longer than the first threshold time Tth1 by a predetermined first cleaning allowable adjustment time Δt1. The first light-degree cleaning process time TW1 is a sum of the first light-degree cleaning time and a predetermined margin time. The first recognition restoring time TR1 is a sum of "a time Ter between the end time point of the first light-degree cleaning process and a time point at which the detecting accuracy of the front LiDAR 11 is restored" and "a predetermined margin time". The time Ter is a time required for the detecting accuracy of the front LiDAR 11 to be restored after the end of the first light-degree cleaning process. A sum of the first light-degree cleaning process time TW1 and the first recognition restoring time TR1 is the first necessary time T1 determined based on the first light-degree cleaning time.

Since the first threshold time Tth1 and the second threshold time Tth2 have been determined as described above in advance, the first necessary time T1 that is the sum of the first light-degree cleaning process time TW1 and the first recognition restoring time TR1 is secured between the end time (end time point) t2 of the first allowable period P1 and the start time (start time point) t3 of the collision avoidance control. Accordingly, if the first light-degree cleaning process starts to be executed within the first allowable period P1, the first light-degree cleaning process ends and the detecting accuracy of the front LiDAR 11 is restored before the start time (start time point) t3 of the collision avoidance control.

Furthermore, the first light-degree cleaning process is allowed to start to be executed only within the first allowable period P1 before the start of executing the collision avoidance control. Therefore, an amount of consumed cleaning fluid can be reduced as compared to a case where the first light-degree cleaning process is always allowed (without restriction).

When the detecting surface part of the front camera 12 becomes very dirty (i.e., when the degree of the dirtiness of the detecting surface part of the front camera 12 is great/high), the vehicle control apparatus DV1 cleans the detecting surface part of the front camera 12, as in the case where the detecting surface part of the front LiDAR 11 becomes very dirty.

More specifically, the vehicle control apparatus DV1 obtains/detects a second dirty degree indicating value indicating a degree of dirtiness of the detecting surface part of the front camera 12. The vehicle control apparatus DV1 obtains/detects the second dirty degree indicating value of the front camera 12, based on the image obtained through the front camera 12. The second dirty degree indicating value becomes greater as a ratio of an area of dirty portions to an entire area of the detecting surface part of the front camera 12 becomes greater. It should be noted that a dirtiness detecting camera configured to take a picture of the detecting surface part of the front camera 12 may be provided, and second dirty degree indicating value may be obtained based on a picture taken by that dirtiness detecting camera.

When the second dirty degree indicating value is equal to or greater than a third threshold Dth3, the vehicle control apparatus DV1 drives the second pump 80 to inject the cleaning fluid from the second nozzle 81 for a predetermined second cleaning time. Namely, the vehicle control apparatus DV1 executes a second cleaning process to perform the second cleaning operation for/over the second cleaning time. It should be noted that the thus executed second cleaning process may be referred to as a "second normal cleaning process", and the second cleaning time for this second cleaning process may be referred to as a "second normal time". In the present example, the second normal time is a time different from the first normal time, however, may be set at a time equal to the first normal time.

In addition, the vehicle control apparatus DV1 executes the second cleaning operation for the second cleaning time to perform the second cleaning process only under a specific circumstance, even when the detecting surface part of the front camera 12 is a little dirty.

Figure 4:
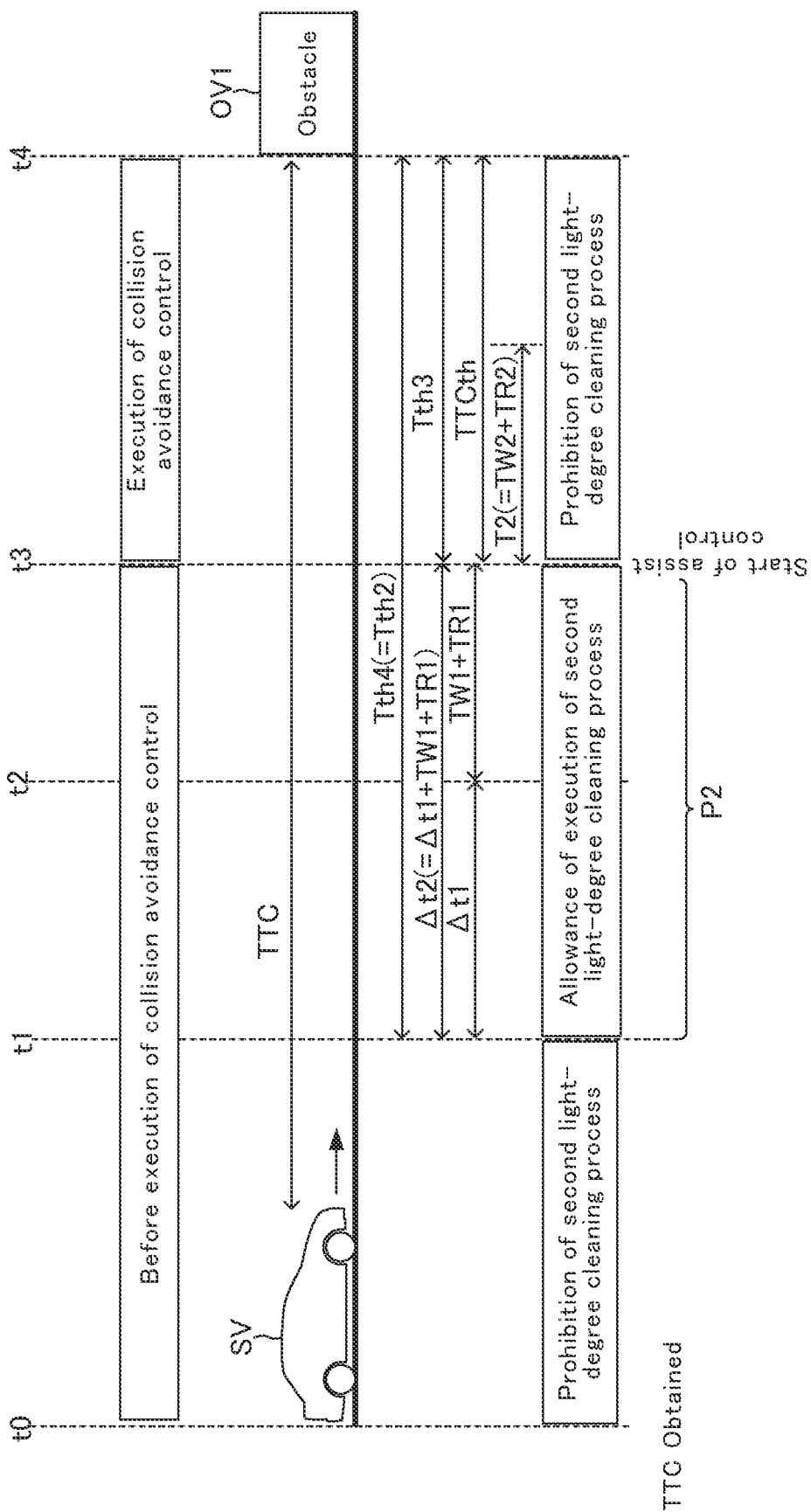
FIG. 4 is another figure for describing an outline of operations of the vehicle control apparatus.

For example, as shown in FIG. 4, it is assumed that the collision prediction time TTC for the obstacle OV1 that is present ahead of the vehicle SV continues to be updated by the DSECU after a time t0, and the collision avoidance control is started to avoid the collision between the vehicle SV and the obstacle OV1 at a time t3.

When the detecting surface part of the front camera 12 is dirty, the front image that includes an image of the obstacle OV1 photographed by the front camera 12 may be blurry. When the front image is blurry, the front images that are stored in the vehicle traveling data recorder 52 may be useless as recorded images (evidence images). Especially, the front image taken at a time t4 at which the vehicle SV reaches the obstacle OV1 is very important as the recorded image. Therefore, a clear image of the obstacle OV1 included in the front image at the time t4 at which the vehicle SV reaches the obstacle OV1 needs to be taken. For this reason, it is necessary for the detecting surface part of the front camera 12 to be in a clean state (immediately) before the time t4 at which the vehicle SV reaches the obstacle OV1.

In view of the above, the vehicle control apparatus DV1 cleans the detecting surface part of the front camera 12 even when the detecting surface part of the front camera 12 is a little dirty, while the collision prediction time TTC of the obstacle OV1 continues being obtained by the DSECU.

More specifically, the vehicle control apparatus DV1 performs the second cleaning operation for the second cleaning time to execute the second cleaning process, when the second dirty degree indicating value of the detecting surface part of the front camera 12 is equal to or greater than a fourth threshold Dth4 smaller than the third threshold Dth3, even if the second dirty degree indicating value is smaller than the third threshold Dth3. It should be noted that the thus executed second cleaning process may be referred to as a "second light-degree cleaning process", and the second cleaning time for this second cleaning process may be referred to as a "second light-degree cleaning time".

However, the vehicle control apparatus DV1 allows the second light-degree cleaning process to be executed (started) only when the collision prediction time TTC is equal to or longer than a third threshold time Tth3 and equal to or shorter than a fourth threshold time Tth4. Thus, the vehicle control apparatus DV1 allows the second light-degree cleaning process to be started only in a second light-degree cleaning process allowable period P2 that is a period between the time t1 and the time t3. It should be noted that the second light-degree cleaning process allowable period P2 may be referred to as a "second allowable period P2."

The third threshold time Tth3 is equal to the collision determining time TTCth. A sum of a second light-degree cleaning process time TW2 and a second recognition restoring time TR2 is shorter than the collision determining time TTCth. Therefore, the sum of the second light-degree cleaning process time TW2 and the second recognition restoring time TR2 is secured between the time t3 which is the end time of the second allowable period P2 and the time t4. The sum of the second light-degree cleaning process time TW2 and the second recognition restoring time TR2 has been determined based on the second light-degree cleaning time, and is referred to as a "second necessary time T2". The fourth threshold time Tth4 is longer than the third threshold time Tth3 by a predetermined second cleaning allowable adjustment time Δt2.

The second light-degree cleaning process time TW2 is a sum of the second light-degree cleaning time and a predetermined margin time. The second recognition restoring time TR2 is a sum of a time Tdr between the end time point of the second light-degree cleaning process and a time point at which the detecting accuracy of the front camera 12 is restored and a predetermined margin time. Namely, the second recognition restoring time TR2 is a time required for the detecting accuracy of the front camera 12 to be restored after the end of the second light-degree cleaning process.

In the present example, the second cleaning allowable adjustment time Δt2 is equal to a sum of the first cleaning allowable adjustment time Δt1, the first light-degree cleaning process time TW1, and the first recognition restoring time TR1. As a result, the fourth threshold time Tth4 is the same time as the second threshold time Tth2, however, the fourth threshold time Tth4 may be different from a time that is the same as the second threshold time Tth2.

Accordingly, if the second light-degree cleaning process starts to be executed within the second allowable period P2, the second light-degree cleaning process ends and the detecting accuracy of the front camera 12 is restored before the time t4. In addition, the second light-degree cleaning process is allowed to start to be executed only in the second allowable period P2, an amount of consumed cleaning fluid can be reduced.

<Specific Operation>

The CPU (hereinafter, simply referred to as a "first CPU") of the DSECU executes a routine shown by a flowchart in FIG. 5, every time a predetermined time elapses.

Figure 5:
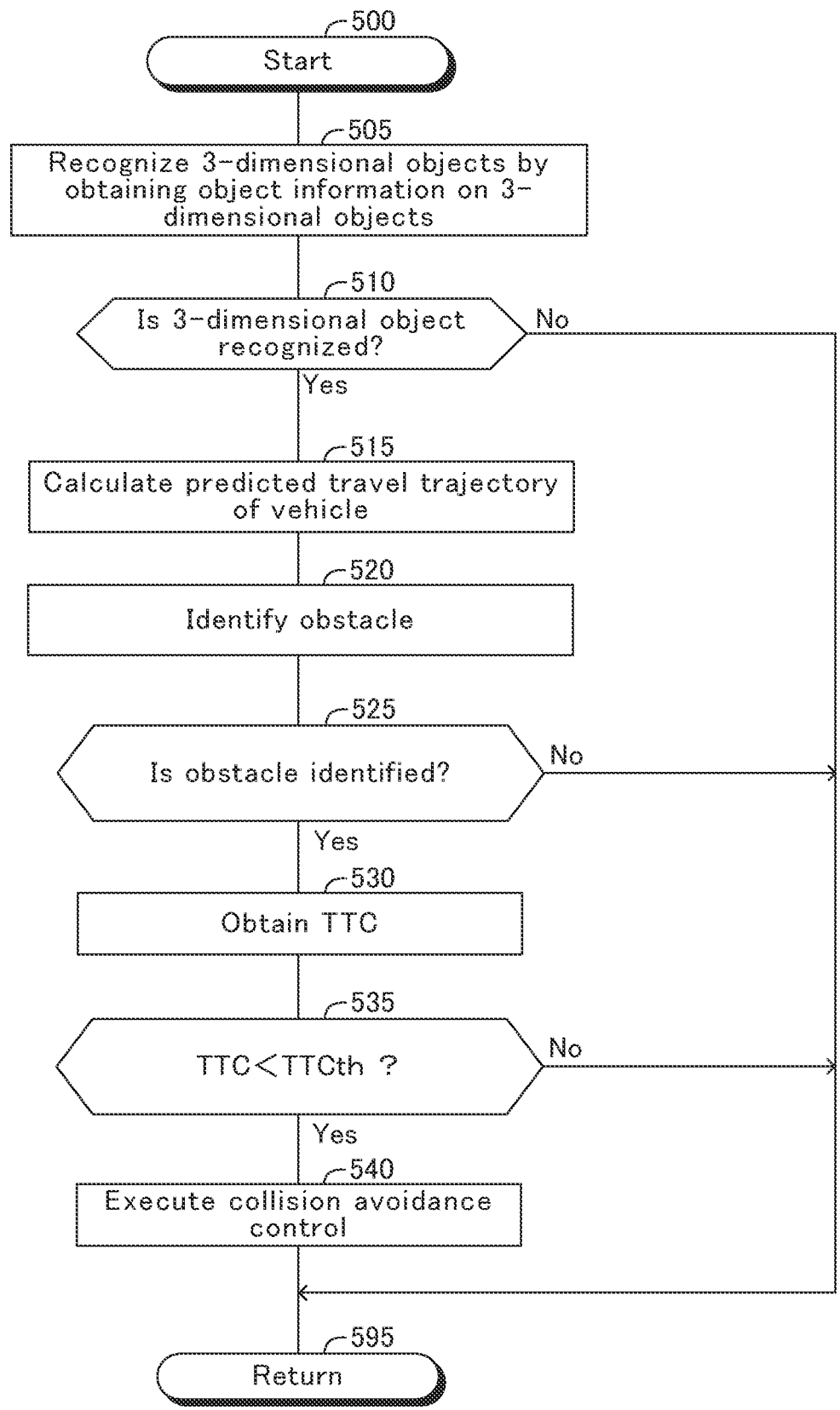
FIG. 5 is a flowchart showing a routine executed by a CPU of a DSECU.

Accordingly, when an appropriate time comes, the first CPU starts process of step 500 shown in FIG. 5, and proceeds to step 505. At step 505, the first CPU obtains object the information on all of the 3-dimensional objects present within the detection area of the front LiDAR 11 using the front LiDAR 11 so as to recognize the 3-dimensional objects.

Thereafter, the first CPU proceeds to step 510 so as to determine whether or not at least one 3-dimensional object is recognized. When no 3-dimensional object is recognized, the first CPU makes a "No" determination at step 510, and proceeds to step 595 so as to terminate the present routine tentatively.

Whereas, when at least one 3-dimensional object is recognized, the first CPU makes a "Yes" determination at step

510, and sequentially executes "processes of step 515 and step 520" described below so as to proceed to step 525.

Step 515: the first CPU calculates the predicted travel trajectory of the vehicle SV, based on "the steering angle θ, the yaw rate Yr, and the vehicle speed Vs" of the vehicle SV.

Step 520: the first CPU identifies/recognizes the obstacle OV1 from among 3-dimensional objects recognized using the front LiDAR 11 based on the predicted travel trajectory of the vehicle SV and the object information on the 3-dimensional objects, as described above.

At step 525, the first CPU determines whether or not the obstacle OV1 is (has been) identified at step 520.

When the obstacle OV1 is not identified at step 520, the first CPU makes a "No" determination at step 525, and proceeds to step 595 so as to terminate the present routine tentatively.

Whereas, when the obstacle OV1 is identified at step 520, the first CPU makes a "Yes" determination at step 525, and proceeds to step 530. At step 530, the first CPU obtains the collision prediction time TTC with respect to the identified obstacle OV1, using the object information on the identified obstacle OV1.

Subsequently, the first CPU proceeds to step 535 so as to determine whether or not the collision prediction time TTC is shorter than the collision determining time TTCth.

When the collision prediction time TTC is equal to or longer than the collision determining time TTCth, the first CPU makes a "No" determination at step 535, and proceeds to step 595 so as to terminate the present routine tentatively.

Whereas, when the collision prediction time TTC is shorter than the collision determining time TTCth, the first CPU makes a "Yes" determination at step 535, and proceeds to step 540. At step 540, the CPU executes the above-described collision avoidance control.

The CPU (hereinafter, simply referred to as a "second CPU") of the WCECU executes a first cleaning process routine shown by a flowchart in FIG. 6, every time a predetermined time elapses. Accordingly, when an appropriate time comes, the second CPU starts process of step 600 shown in FIG. 6, and proceeds to step 605. At step 605, the second CPU determines whether or not a value of a first automatic cleaning flag Xf1 is "b 0."

It should be noted that the second CPU sets/varies the value of the first automatic cleaning flag Xf1 through unillustrated routine. More specifically, the second CPU sets the value of the first automatic cleaning flag Xf1 to "1", when the first cleaning process starts to be executed so that the cleaning fluid starts to be injected from the first nozzle 71. The second CPU sets the value of the first automatic cleaning flag Xf1 to "0", when the first necessary time T1 has elapsed since the time point at which the cleaning fluid starts to be injected from the first nozzle 71 due to the first cleaning process. The value of the first automatic cleaning flag Xf1 is set to "0" through an initialization routine executed by the second CPU when an unillustrated ignition key switch of the vehicle SV is changed from an off position to an on position.

When the value of the first automatic cleaning flag Xf1 is "1", the second CPU makes a "No" determination at step 605, and proceeds to step 695 so as to terminate the present routine tentatively.

Whereas, when the value of the first automatic cleaning flag Xf1 is "0", the second CPU makes a "Yes" determination at step 605, and proceeds to step 610. At step 610, the second CPU obtains the first dirty degree indicating value based on the amount of light of the reflected laser light obtained from the front the LiDAR 11 through the DSECU, and proceeds to step 615.

At step 615, the second CPU determines whether or not the first dirty degree indicating value of the detecting surface part of the front LiDAR 11 is smaller than the first threshold Dth1.

When the first dirty degree indicating value of the detecting surface part of the front LiDAR 11 is equal to or greater than the first threshold Dth1, the second CPU makes a "No" determination at step 615, and proceeds to step 620. At step 620, the second CPU starts driving the first pump 70 to start executing the first cleaning process (i.e., the first normal cleaning process). It should be noted that the first cleaning process is ended by stopping driving the first pump 70 when the first cleaning time has passed since the start of the first cleaning process, through an unillustrated routine executed by the second CPU. Subsequently, the second CPU proceeds to step 695 so as to terminate the present routine tentatively.

Whereas, when the first dirty degree indicating value of the detecting surface part of the front LiDAR 11 is smaller than the first threshold Dth1, the second CPU makes a "Yes" determination at step 615, and proceeds to step 625. At step 625, the second CPU determines whether or not the obstacle OV1 with respect to the vehicle SV is (has been) recognized by the DSECU (i.e., whether or not the DSECU has succeeded to identify the obstacle OV1).

When the obstacle OV1 is not (has not been) recognized, the second CPU makes a "No" determination at step 625, and proceeds to step 695 so as to terminate the present routine tentatively.

Whereas, when the obstacle OV1 is (has been) recognized by the DSECU, the second CPU makes a "Yes" determination at step 625, and proceeds to step 630. At step 630, the second CPU obtains the collision prediction time TTC of the obstacle OV1 from the DSECU.

Subsequently, the second CPU proceeds to step 635 so as to determine whether or not the first dirty degree indicating value obtained at step 610 is equal to or greater than the second threshold Dth2. As described above, the second threshold Dth2 has been set at a value smaller than the first threshold Dth1.

When the first dirty degree indicating value is smaller than the second threshold Dth2, the second CPU makes a "No" determination at step 635, and proceeds to step 695 so as to terminate the present routine tentatively.

Whereas, when the first dirty degree indicating value is equal to or greater than the second threshold Dth2, the second CPU makes a "Yes" determination at step 635, and proceeds to step 640. At step 640, the second CPU determines whether or not the collision prediction time TTC is equal to or longer than the first threshold time Tth1 and is equal to or shorter than the second threshold time Tth2.

When the collision prediction time TTC is equal to or longer than the first threshold time Tth1 and is equal to or shorter than the second threshold time Tth2, the second CPU makes a "Yes" determination at step 640, and proceeds to step 620. At step 620, the second CPU starts driving the first pump 70 to start executing the first cleaning process (i.e., the first light-degree cleaning process). Subsequently, the second CPU proceeds to step 695 so as to terminate the present routine tentatively.

Whereas, when the collision prediction time TTC is shorter than the first threshold time Tth1 or when the collision prediction time TTC is longer than the second threshold time Tth2, the second CPU makes a "No" determination at step 640, and proceeds to step 695 so as to terminate the present routine tentatively.

Figure 7:
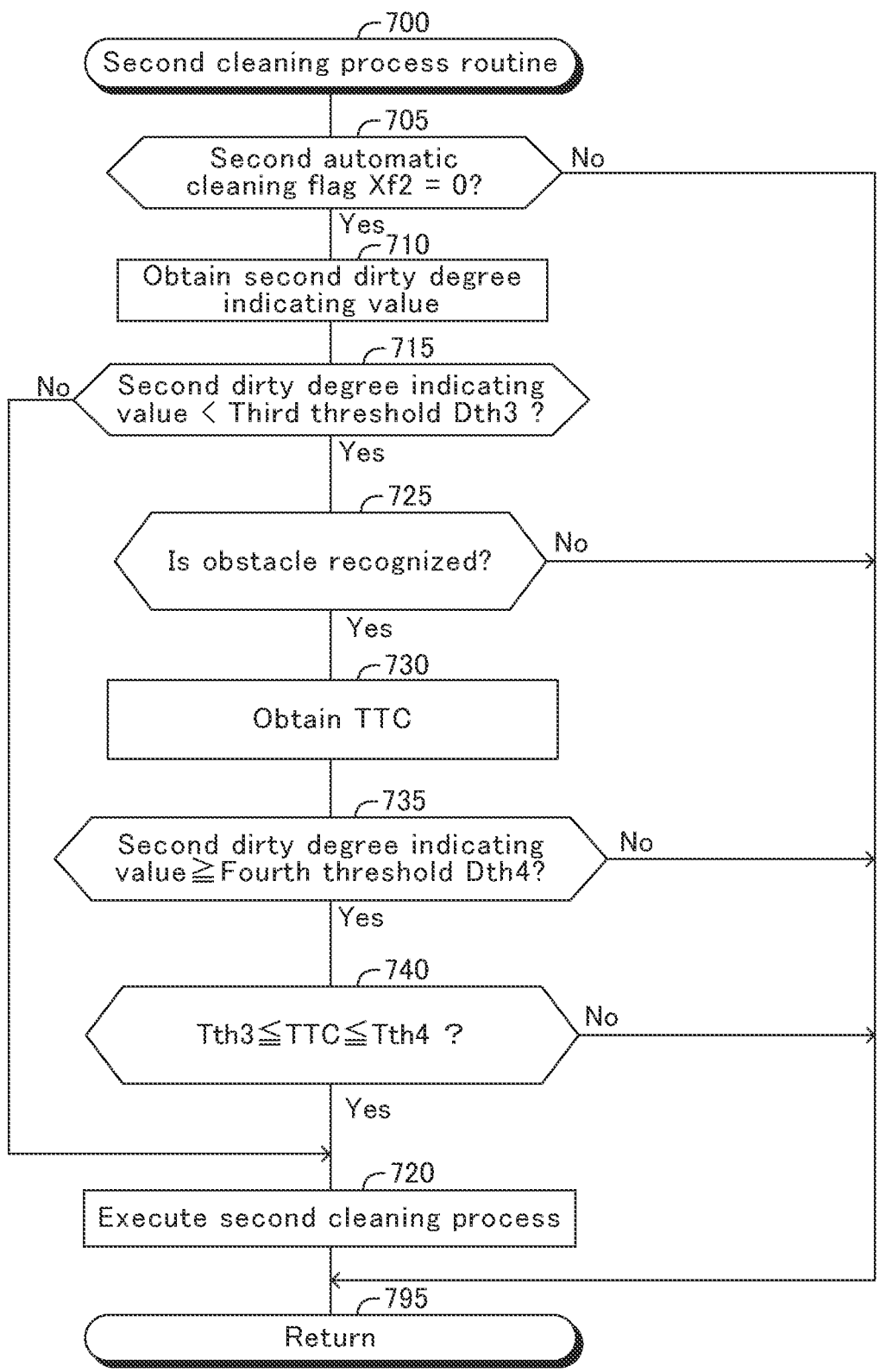
FIG. 7 is a flowchart showing a second cleaning process routine executed by the CPU of the WCECU.

The second CPU executes a second cleaning process routine shown by a flowchart in FIG. 7, every time a predetermined time elapses. Accordingly, when an appropriate time comes, the second CPU starts process of step 700 shown in FIG. 7, and proceeds to step 705. At step 705, the second CPU determines whether or not a value of a second automatic cleaning flag Xf2 is "0".

The second CPU sets/varies the value of the second automatic cleaning flag Xf2 through unillustrated routine. More specifically, the second CPU sets the value of the second automatic cleaning flag Xf2 to "1", when the second cleaning process starts to be executed so that the cleaning fluid is injected from the second nozzle 81. The second CPU sets the value of the second automatic cleaning flag Xf2 to "0", when the second necessary time T2 has elapsed since the time point at which the cleaning fluid starts to be injected from the second nozzle 81 due to the second cleaning process. The value of the second automatic cleaning flag Xf2 is set to "0" through the above-described initialization routine executed by the second CPU.

When the value of the second automatic cleaning flag Xf2 is "1", the second CPU makes a "No" determination at step 705, and proceeds to step 795 so as to terminate the present routine tentatively.

Whereas, when the value of the second automatic cleaning flag Xf2 is "0", the second CPU makes a "Yes" determination at step 705, and proceeds to step 710. At step 710, the second CPU obtains the second dirty degree indicating value based on the front image (front image information) obtained from the front camera 12 through the DSECU.

Subsequently, the second CPU proceeds to step 715 so as to determine whether or not the second dirty degree indicating value is smaller than the third threshold Dth3.

When the second dirty degree indicating value is equal to or greater than the third threshold Dth3, the second CPU makes a "No" determination at step 715, and proceeds to step 720. At step 720, the second CPU starts driving the second pump 80 to start executing the second cleaning process. It should be noted that the second cleaning process is ended by stopping driving the second pump 80 when the second cleaning time has passed since the start of the second cleaning process, through an unillustrated routine executed by the second CPU. Subsequently, the second CPU proceeds to step 795 so as to terminate the present routine tentatively.

Whereas, when the second dirty degree indicating value is smaller than the third threshold Dth3, the second CPU makes a "Yes" determination at step 715, and proceeds to step 725. At step 725, the second CPU determines whether or not the obstacle OV1 is (has been) recognized by the DSECU.

When the obstacle OV1 is not (has not been) recognized, the second CPU makes a "No" determination at step 725, and proceeds to step 795 so as to terminate the present routine tentatively.

Whereas, when the obstacle OV1 is (has been) recognized by the DSECU, the second CPU makes a "Yes" determination at step 725, and proceeds to step 730. At step 730, the second CPU obtains the collision prediction time TTC of the obstacle OV1 from the DSECU.

Subsequently, the CPU proceeds to step 735 so as to determine whether or not the second dirty degree indicating value obtained at step 710 is equal to or greater than the fourth threshold Dth4. As described above, the fourth threshold Dth4 has been set at a value smaller than the third threshold Dth3.

When the second dirty degree indicating value is smaller than the fourth threshold Dth4, the second CPU makes a "No" determination at step 735, and proceeds to step 795 so as to terminate the present routine tentatively.

Whereas, when the second dirty degree indicating value is equal to or greater than the fourth threshold Dth4, the second CPU makes a "Yes" determination at step 735, and proceeds to step 740. At step 740, the second CPU determines whether or not the collision prediction time TTC is equal to or longer than the third threshold time Tth3 and is equal to or shorter than the fourth threshold time Tth4.

When the collision prediction time TTC is equal to or longer than the third threshold time Tth3 and is equal to or shorter than the fourth threshold time Tth4, the second CPU makes a "Yes" determination at step 740, and proceeds to step 720. At step 720, the second CPU starts driving the second pump 80 to start executing the second cleaning process (i.e., the second light-degree cleaning process). Subsequently, the second CPU proceeds to step 795 so as to terminate the present routine tentatively.

Whereas, when the collision prediction time TTC is shorter than the third threshold time Tth3 or when the collision prediction time TTC is longer than the fourth threshold time Tth4, the second CPU makes a "No" determination at step 740, and proceeds to step 795 so as to terminate the present routine tentatively.

As has been described above, the present vehicle control apparatus can reduce a possibility that the detection accuracy of the front LiDAR 11 is degraded due to the dirtiness of the detecting surface part of the front LiDAR 11 or the first cleaning operation while the collision avoidance control is being executed. Therefore, the present vehicle control apparatus can reduce a possibility that the accuracy of the collision avoidance control is degraded due to the dirtiness of the detecting surface part of the front LiDAR 11 or the first cleaning operation.

In addition, the present vehicle control apparatus can reduce a possibility that the detection accuracy of the front camera 12 is degraded due to the dirtiness of the detecting surface part of the front camera 12 or the second cleaning operation when the vehicle SV reaches the obstacle OV1. Therefore, the present vehicle control apparatus can reduce a possibility that the image of the obstacle OV1 taken by the front camera 12 becomes blurry due to the dirtiness of the detecting surface part of the front camera 12 or the second cleaning operation when the vehicle SV reaches the obstacle OV1.

Modified Example 1

In a modified example 1 of the present vehicle control apparatus, the front camera 12 is also configured to obtain the object information of the 3-dimensional object (that may be the obstacle OV1). In this case, the front camera 12 is also referred to as a "first on-board sensor", similarly to the front LiDAR 11. In the case where the front camera 12 is configured to obtain the object information and the image of the obstacle OV1, a cleaning process for the front camera 12 is performed in the same way as the first cleaning process for the front LiDAR 11.

Figure 6:
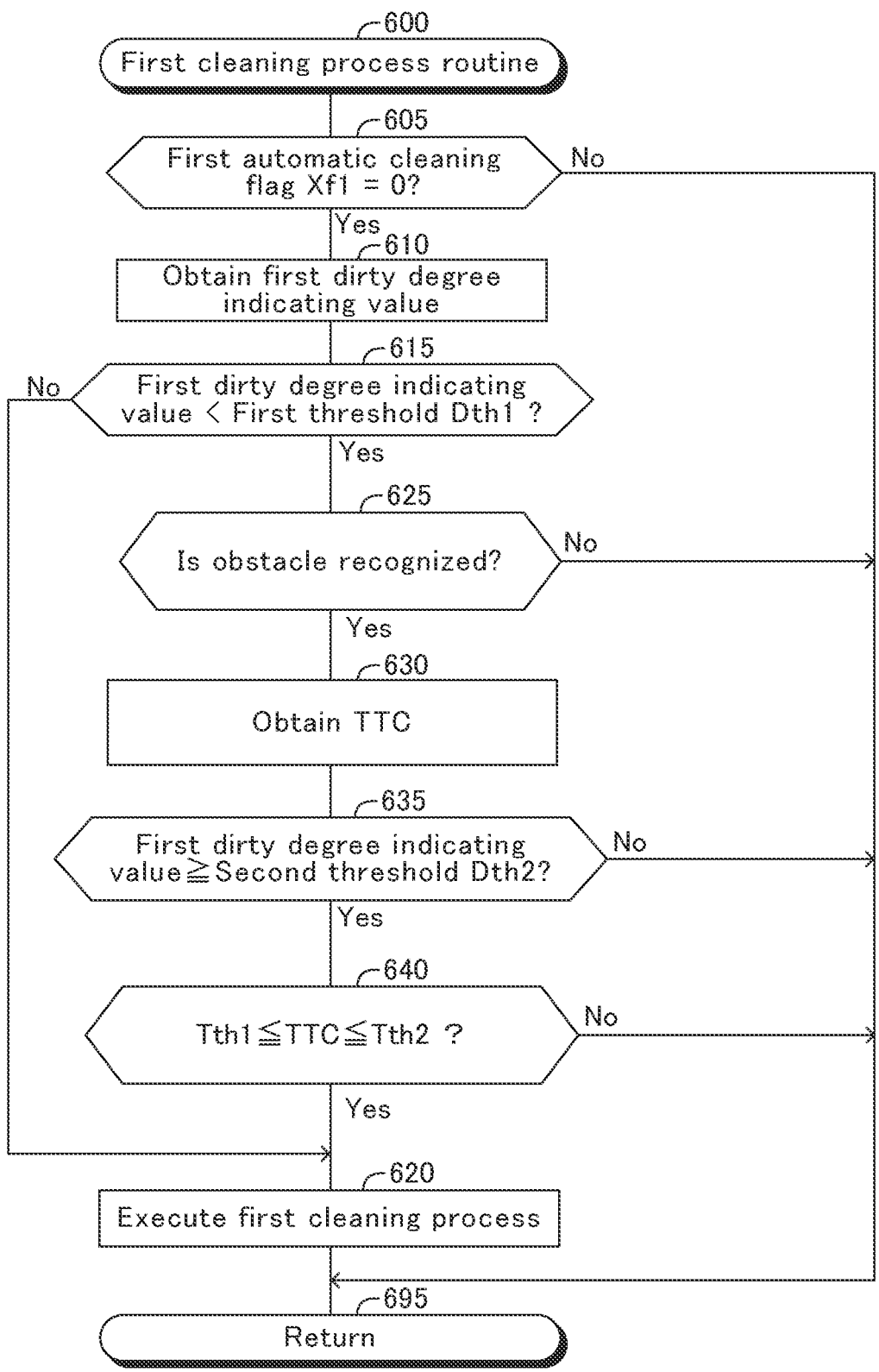
FIG. 6 is a flowchart showing a first cleaning process routine executed by a CPU of a WCECU.

Namely, the cleaning process of the modified example 1 is performed by an unillustrated routine similarly to the first cleaning routine shown in FIG. 6. It should be noted, however, in the routine of the modified example 1, the process for the front LiDAR 11 shown in FIG. 6 and the first automatic cleaning flag Xf1 shown in FIG. 6 are replaced with the process for the front camera 12 and the second automatic cleaning flag Xf2, respectively.

The present disclosure is not limited to the above embodiment and the modified example, but may employ various modifications within the scope of the present disclosure.

For example, in the embodiment and the modified example, the vehicle control apparatus DV1 may comprise a warning sound generating device capable of generating a warning/alarm sound to the occupants of the vehicle SV. In this case, the vehicle control apparatus DV1 may perform an operation to let the warning sound generating device generate the warning sound (or an operation to warn the driver using the warning sound) as the driving assist operation to avoid the collision between the vehicle SV and the obstacle OV1, when the collision prediction time TTC is shorter than the collision determining time TTCth. Furthermore, the vehicle control apparatus DV1 may perform an operation to let the display device 51 display an alert (or a warning) image for causing the driver of the vehicle SV to notice that the vehicle SV is approaching the obstacle OV1, as the driving assist operation to avoid the collision between the vehicle SV and the obstacle OV1, so as to alarm the driver by displaying the alarm image. In this case, the vehicle control apparatus DV1 may display the alert image on the display device 51 to alert the driver, when the collision prediction time TTC is shorter than the collision determining time TTCth.

In the embodiment and the modified example, the vehicle control apparatus DV1 may determine whether or not there is a high probability that the vehicle SV collides with the obstacle OV1 using a collision probability indicating value other than the collision prediction time TTC, and may perform the collision avoidance control when it is determined that there is the high probability that the vehicle SV collides with the obstacle OV1. For example, the collision probability indicating value may be a relative distance of the obstacle OV1 with respect to the vehicle SV, the relative speed Vfx of the obstacle OV1 with respect to the vehicle SV, or a relative lateral speed of the obstacle OV1 with respect to the vehicle SV. In addition, the collision probability indicating value may be a deceleration of the vehicle SV required for the vehicle SV in order to stop before the vehicle SV reaches the obstacle OV1. The deceleration may be calculated based on the relative speed Vfx of the obstacle OV1 with respect to the vehicle SV and the relative distance of the obstacle OV1 with respect to the vehicle SV.

Figure 8:
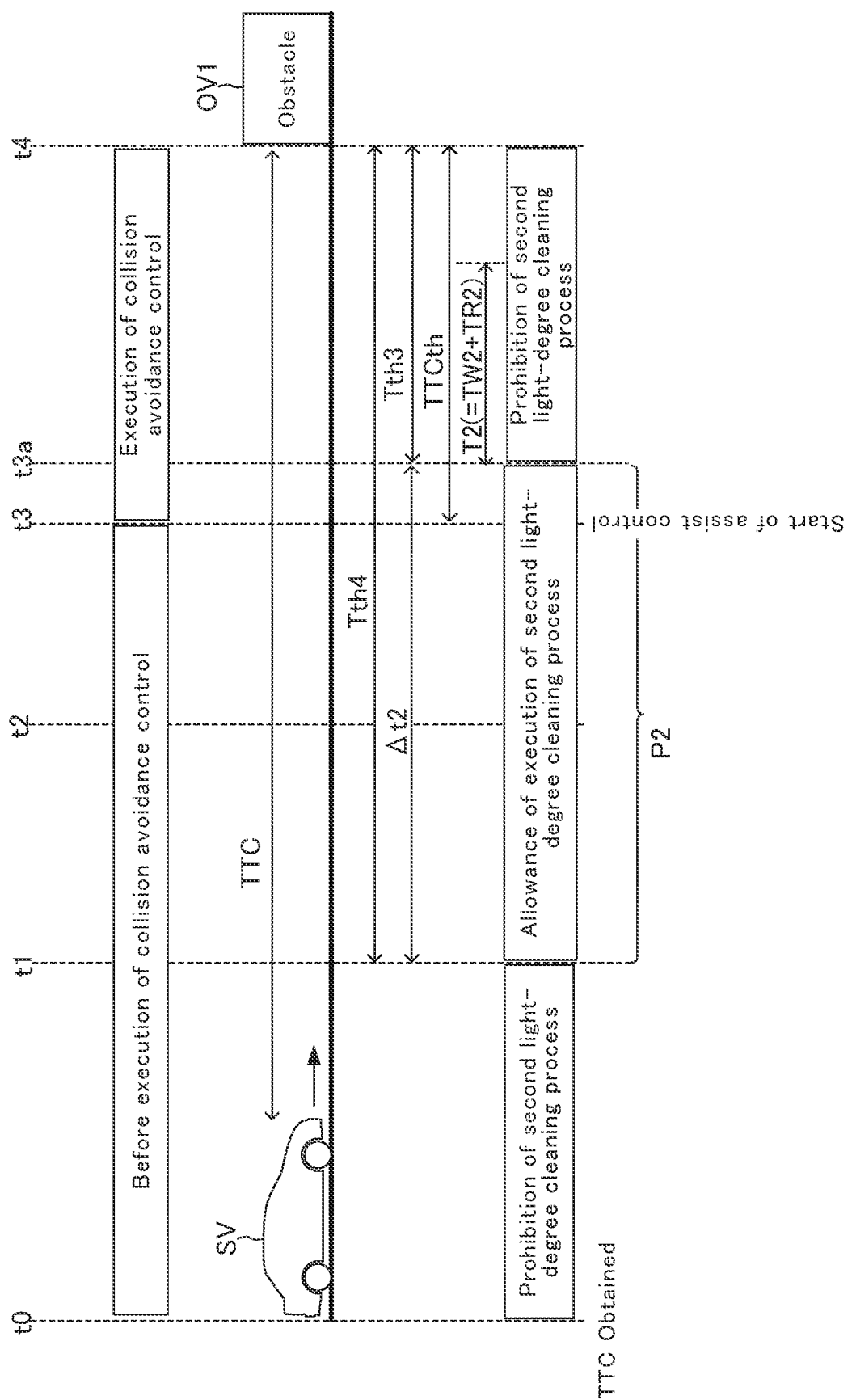
FIG. 8 is a figure for describing an outline of operations of a modified example of the vehicle control apparatus of the present disclosure.

In the embodiment, as shown in FIG. 8, the third threshold time Tth3 may be set to a time that is shorter than the collision determining time TTCth and is longer than the second necessary time T2. In this case, the end time point of the second allowable period P2 is set at a time point (t3a shown in FIG. 8) a "predetermined time (i.e., third threshold time Tth3) longer than the second necessary time T2" before a predicted collision occurrence time point (t4 shown in FIG. 8). Furthermore, the start time point of the second allowable period P2 is set at a time point before the end time point of the second allowable period P2. In this case, when the second light-degree cleaning process is started within the second allowable period P2, the second light-degree cleaning process is ended before the time t4, and the detection accuracy of the front camera 12 is restored before the time t4. Accordingly, a possibility that the image of the obstacle OV1 taken by the front camera 12 becomes blurry due to the dirtiness of the detecting surface part of the front camera 12 or the second cleaning operation when the vehicle SV reaches the obstacle OV1 can also be reduced.

In the embodiment and the modified example, the time length (i.e., the first normal time) for which the first cleaning operation of the first normal cleaning process is executed and the time length (i.e., the first light-degree cleaning time) for which the first cleaning operation of the first light-degree cleaning process is executed are the same as each other, however, they may be different from each other. In addition, the time length for which the first cleaning operation is executed may be varied depending on a kind of the dirtiness.

In the embodiment and the modified example, the time length (i.e., the second normal time) for which the second cleaning operation of the second normal cleaning process is executed and the time length (i.e., the second light-degree cleaning time) for which the second cleaning operation of the second light-degree cleaning process is executed are the same as each other, however, they may be different from each other. In addition, the time length for which the second cleaning operation is executed may be varied depending on a kind of the dirtiness.

In the embodiment and the modified example, the vehicle control apparatus DV1 may include a plurality of on-board sensors used to obtain information on an obstacle that is present in an area in the vicinity of the vehicle SV other than the frontward area. The vehicle control apparatus DV1 may include pumps and cleaning nozzles for cleaning those on-board sensors. In this case, the obstacle response control may be a vehicle control to respond to an obstacle that is present not only in the frontward area but also in an area in the vicinity of the vehicle SV other than the frontward area.

In the embodiment and the modified example, the vehicle control apparatus DV1 may include a rear camera configured to take a picture of a backward area of the vehicle SV, a left side camera configured to take a picture of a left side area of the vehicle SV, and a right side camera configured to take a picture of a right side area of the vehicle SV. In this case, the vehicle control apparatus DV1 may include pumps and cleaning nozzles for cleaning those cameras. In addition, the vehicle control apparatus DV1 may perform a cleaning process for each of those cameras, similarly to the second cleaning process for the front camera 12.

In the embodiment and the modified example, the front camera 12 may be disposed on a front windshield in the side of the cabin of the vehicle SV, and be configured to obtain the front image information utilizing visible light passing through the front windshield. In this case, the detecting surface part of the front camera 12 is a part (window part) of the front windshield through which the visible light passes that is input to the front camera 12.

What is claimed is:
1. A vehicle control apparatus comprising:
a first on-board sensor configured to obtain object information of an object that is present around a vehicle, using an electromagnetic wave which passes through a first detecting surface part exposed to outside of said vehicle;
a second on-board sensor configured to repeatedly obtain image data of said object that is present around said vehicle, using light, as an electromagnetic wave, which passes through a second detecting surface part exposed to outside of said vehicle;
a first cleaning unit configured to be capable of performing a first cleaning operation to clean said first detecting surface part using cleaning fluid;
a second cleaning unit configured to be capable of performing a second cleaning operation to clean said second detecting surface part using cleaning fluid;

a storing device configured to store information including said image data;

a driving assist device including at least one of a control actuator configured to change a state of said vehicle and a warning device configured to generate a warning to an occupant of said vehicle; and a control unit configured to:
control said first cleaning unit;
obtain, based on said object information, a collision probability indicating value correlated with a probability that said vehicle collides with said object;
cause said driving assist device to start performing a driving assist operation to avoid a collision between said vehicle and an obstacle that is said object, from an assist start time point at which collision probability indicating value of said obstacle satisfies a predetermined driving assist condition;
obtain a first dirty degree indicating value representing a degree of dirtiness of said first detecting surface part;
start a first normal cleaning process to cause said first cleaning unit to perform said first cleaning operation for a first normal duration, when a first normal cleaning condition becomes satisfied, said first normal cleaning condition being a condition to be satisfied when said first dirty degree indicating value is equal to or greater than a first threshold;
start a first light-degree cleaning process to cause said first cleaning unit to perform said first cleaning operation for a first light-degree cleaning duration, when a first light-degree cleaning condition becomes satisfied within a first allowable period, said first light-degree cleaning condition being a condition to be satisfied when said first dirty degree indicating value is smaller than said first threshold and is equal to or greater than a second threshold that is smaller than said first threshold;
obtain a second dirty degree indicating value representing a degree of dirtiness of said second detecting surface part;
start a second normal cleaning process to cause said second cleaning unit to perform said second cleaning operation for a second normal duration, when a second normal cleaning condition becomes satisfied, said second normal cleaning condition being a condition to be satisfied when said second dirty degree indicating value is equal to or greater than a third threshold; and
start a second light-degree cleaning process to cause said second cleaning unit to perform said second cleaning operation for a second light-degree cleaning duration, when a second light-degree cleaning condition becomes satisfied within a second allowable period, said second light-degree cleaning condition being a condition to be satisfied when said second dirty degree indicating value is smaller than said third threshold and is equal to or greater than a fourth threshold that is smaller than said third threshold, and wherein,
a start time point of said first allowable period is set at a time point that is a first start time duration before said assist start time point, said first start time duration being longer than said first light-degree cleaning duration;
an end time point of said first allowable period is set at a time point that is a first necessary time duration before said assist start time point, said first necessary time duration being longer than said first light-degree cleaning duration and being shorter than said first start time duration, and said first necessary duration being set at a time which has been determined based on said first light-degree cleaning duration;
a start time point of said second allowable period is set at a time point before said end time point of said second allowable period; and
an end time point of said second allowable period is set at a time point a predetermined duration, that is longer than a second necessary duration that has been determined based on said second light-degree cleaning duration, before a predicted collision occurrence time point at which said collision probability indicating value reaches a value obtained when said vehicle and said obstacle are presumed to collide with each other, and wherein
said first necessary duration is equal to a sum of a first light-degree cleaning process duration based on said first light-degree cleaning duration and a first recognition restoring duration based on a time necessary for said first on-board sensor after said first light-degree cleaning process;
said first start duration is a sum of said first necessary duration and a predetermined first cleaning allowable adjustment duration;
said second necessary duration is equal to a sum of a second light-degree cleaning process duration based on said second light-degree cleaning duration and a second recognition restoring duration based on a time necessary for said second on-board sensor after said second light-degree cleaning process; and
a second cleaning allowable adjustment duration is determined based on a sum of said predetermined first cleaning allowable adjustment duration, said first necessary duration, and said first recognition restoring duration.

2. The vehicle control apparatus according to claim 1, wherein
said end time point of said second allowable period is set at said assist start time point.

3. The vehicle control apparatus according to claim 1, wherein
said control unit is configured to:
calculate, as said collision probability indicating value, a collision prediction duration which is a predicted duration between a present time point and a time point at which said vehicle collides with said object; and
determine that said driving assist condition becomes satisfied when said collision prediction duration becomes shorter than a predetermined collision determination threshold duration,
and wherein,
said start time point of said first allowable period is a time point at which said collision prediction duration becomes equal to a second threshold duration that is equal to a sum of said collision determination threshold duration and said first start duration; and
said end time point of said first allowable period is a time point at which said collision prediction duration becomes equal to a first threshold duration that is equal to a sum of said collision determination threshold duration and said first necessary duration.

4. The vehicle control apparatus according to claim 1, wherein
said control unit is configured to:
calculate, as said collision probability indicating value, a collision prediction duration which is a predicted duration between a present time point and a time point at which said vehicle collides with said object; and
determine that said driving assist condition becomes satisfied when said collision prediction duration becomes shorter than a predetermined collision determination threshold duration,
and wherein,
said start time point of said second allowable period is a time point at which said collision prediction duration becomes equal to a fourth threshold duration that is longer than a third threshold duration; and
said end time point of said second allowable period is a time point at which said collision prediction duration becomes equal to said third threshold duration.

5. The vehicle control apparatus according to claim 4, wherein,
said third threshold duration is equal to said collision determination threshold duration.

6. The vehicle control apparatus according to claim 2, wherein,
said control unit is configured to:
calculate, as said collision probability indicating value, a collision prediction duration which is a predicted time between a present time point and a time point at which said vehicle collides with said object; and
determine that said driving assist condition becomes satisfied when said collision prediction duration becomes shorter than a predetermined collision determination threshold duration,
and wherein,
said start time point of said first allowable period is a time point at which said collision prediction duration becomes equal to a second threshold duration that is equal to a sum of said collision determination threshold duration and said first start duration; and
said end time point of said first allowable period is a time point at which said collision prediction duration becomes equal to a first threshold duration that is equal to a sum of said collision determination threshold duration and said first necessary duration.

7. The vehicle control apparatus according to claim 4, wherein the fourth threshold duration is equal to a sum of the third threshold duration and the second cleaning allowable adjustment duration.

* * * * *